United States Patent [19]

Shimizu

[11] Patent Number: 4,910,788

[45] Date of Patent: Mar. 20, 1990

[54] SLIDE BEARING UNIT

[76] Inventor: Rikuro Shimizu, 29-4, Nanzenjikitanobo-cho Sakyo-ku, Kyoto, Japan

[21] Appl. No.: 301,085

[22] Filed: Jan. 25, 1989

[30] Foreign Application Priority Data

Mar. 26, 1988 [JP] Japan .............................. 63-39791[U]
Apr. 20, 1988 [JP] Japan .............................. 63-53736[U]

[51] Int. Cl.⁴ ........................ F16C 23/04; F16C 33/10
[52] U.S. Cl. .................................... 384/192; 384/207; 384/214
[58] Field of Search ........................ 384/192, 202–210, 384/213, 214, 279

[56] References Cited

U.S. PATENT DOCUMENTS

| | | | |
|---|---|---|---|
| 1,656,508 | 1/1928 | Claus | 384/207 |
| 1,896,972 | 2/1933 | Redmond | 384/192 X |
| 3,034,838 | 5/1962 | Abel | 384/214 |
| 4,014,596 | 3/1977 | Kazama | 384/207 |

FOREIGN PATENT DOCUMENTS 95714 2/1988 China .
161418 10/1986 Japan .
2010984 7/1979 United Kingdom ................ 384/213

*Primary Examiner*—Thomas R. Hannon
*Attorney, Agent, or Firm*—Armstrong, Nikaido, Marmelstein, Kubovcik & Murray

[57] ABSTRACT

There is provided according to the invention a slide bearing unit in which a cylindrical outer cylinder which is made of thin steel plate is disposed on outer periphery of an oil-impregnated bearing metal with a certain distance; an oil-impregnated bearing metal is held either by a section formed by bending ends of the outer cylinder inwardly or an annular member used in cooperation with the sections formed by bending inwardly; a gap formed inside is filled with an oil-storage material so that the oil-impregnated bearing metal is supplied with a lubricating oil; and either the section formed by bending inwardly or the annular member may be provided with a small hole in order to by-pass internal pressure, when required.

5 Claims, 3 Drawing Sheets

SLIDE BEARING UNIT

BACKGROUND OF THE INVENTION

The present invention relates to improvements of slide bearing unit and, more particularly, to a slide bearing unit used with a low load with dimensions of internal diameter, external diameter and width which can be the same as that of a rolling bearing.

Hitherto, small size slide bearing units having oil-impregnated bearing metal are difficult to be constructed so as to have the same dimensions as rolling bearings in terms of internal diameter, external diameter and width. The reason for this is that in the conventional slide bearing units, the ratio of external diameter or width to internal diameter is tends to be large due to their structures as compared with rolling bearings. Slide bearing units are generally less expensive than rolling bearings. However, when a slide bearing unit is to be used in place of a rolling bearing (i.e., the substitution of the latter for the former), a problem exists in that it becomes necessary to make some design change for bearing fitting opening or the like, thereby resulting in increase in cost.

SUMMARY OF THE INVENTION

It is therefore an object of the present invention to provide a slide bearing unit with oil-impregnated bearing metal, having dimensions of internal diameter, external diameter and width which can be the same as those of a rolling bearing.

In order to accomplish the foregoing object, the slide bearing unit in accordance with the present invention has following aspects A to E:

A. A slide bearing unit, comprising
  a cylindrical outer cylinder made of a thin steel plate;
  an oil-impregnated bearing metal having an outer periphery, werein said outer cylinder is disposed on said outer periphery of said bearing metal;
  enclosing sections for holding and enclosing an annular side section between open end portions of the outer cylinder and end portions of the oil-impregnated bearing metal; and
  an oil storage material filled within a gap formed between the outer cylinder and the oil-impregnated bearing metal,
  wherein one of said enclosing sections comprises one end of the outer cylinder which is inwardly and perpendicularly bent, while the other end of the outer cylinder is engageable with another of said enclosing sections which is also inwardly and perpendicularly bent for abutting with said annular side section and being retained on the other end of the outer cylinder, wherein two opposite sides of said bearing unit are flat, and at least one of the enclosing sections is provided with a small hole communicating with the outside air.
B. A slide bearing unit, comprising:
  a spherical oil-impregnated bearing metal having a convex surface on an outside portion thereof;
  an outer cylinder wherein one end of a cylindrical section made of a thin steel plate is formed into a flange section bent inwardly and perpendicularly, the other end is formed into an annular side wall section as a metal holding section bent inwardly and perpendicularly, for holding said spherical oil-impregnated bearing metal to permit self-aligning;
  a metal holder separate from said inwardly and perpendicularly bent section of said outer cylinder having an inwardly protruding metal pressing section to seat said spherical oil-impregnated bearing metal on the metal holding section of the outer cylinder and which is disposed in said outer cylinder so as to be prevented from getting out; and
  an oil-storage material placed in a gap formed between the outer cylinder and the spherical oil-impregnated bearing metal, two opposite sides of said bearing unit being flat.
C. A slide bearing unit, comprising:
  an oil-impregnated bearing metal which is provided with stepped portions being respectively thinned at the outer periphery of side end portions thereof;
  an outer cylinder wherein ends of a cylindrical section made of a thin steel plate are formed into flange sections by being bent inwardly and perpendicularly from an outer periphery to an inner portion of said outer cylinder, and said flange sections engage respectively with said stepped portions of the oil-impregnated bearing metal; and
  an oil-storage material placed in a gap formed between the outer cylinder and the oil-impregnated bearing metal, two opposite sides of said bearing unit being flat.
D. A slide bearing unit, comprising:
  an oil-impregnated bearing metal which is provided with stepped portions being thinned at the outer periphery of side end portions thereof;
  an outer cylinder wherein one end of a cylindrical section made of a thin steel plate is formed into a flange section by being bent inwardly and perpendicularly from an outer periphery to an inner portion of the outer cylinder, the other end is formed into an annular side wall section by being bent inwardly and perpendicularly, and further having an open end of the side wall section formed into an annular metal holding section by being bent inwardly so as to engage with one of said stepped portions;
  a metal holder having an annular projecting metal holding section formed in such a manner as to engage with the other stepped portion of said oil-impregnated bearing metal, and disposed in said outer cylinder so as to be prevented from getting out to thereby hold the oil-impregnated bearing metal in cooperation with said metal holding section of the outer cylinder; and
  an oil-impregnated material placed in a gap formed between the outer cylinder and the oil-impregnated bearing metal, two opposite sides of said bearing unit being flat.
E. A slide bearing unit as in the above paragraphs B or D, wherein at least one small hole for communicating with the outside air is formed through at least one of said side wall section of the outer cylinder and said side wall section of the metal holder.

BRIEF DESCRIPTION OF THE DRAWINGS

In the drawings forming a part of the present invention, and in which like reference numerals are designated to like parts throughout the same.

DESCRIPTION OF THE PREFERRED EMBODIMENTS

Referring now to the accompanying drawings, several embodiments of the present invention are described in detail hereinafter.

Figure 1:
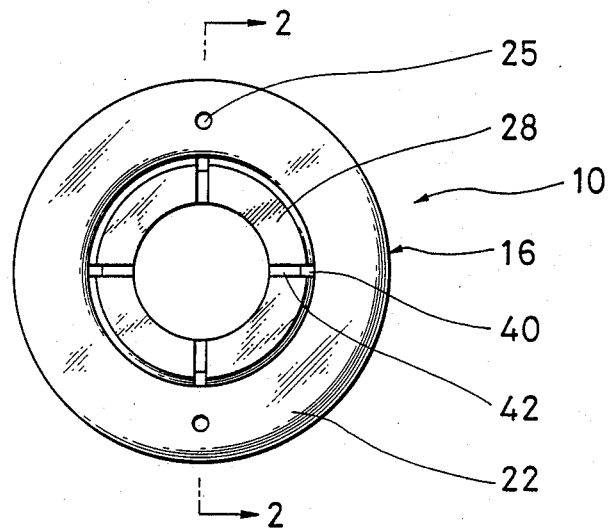
FIG. 1 is an enlarged front view illustrating an example of the invention.
Figure 2:
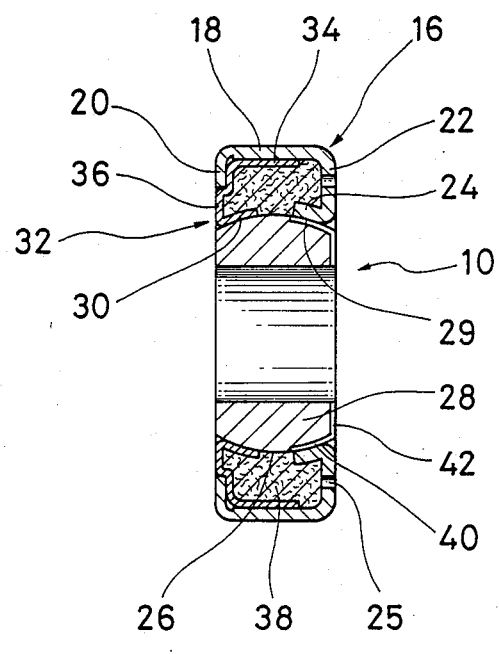
FIG. 2 is a sectional view taken along the line 2—2 in FIG. 1.

The slide bearing unit 10 as an embodiment enlargedly shown in FIGS. 1 and 2 is of self-aligning and small type having the same size as roller bearing of small diameter. Referring to FIGS. 1 and 2, reference numeral 16 denotes the outer cylinder, and one end of the cylindrical section 18 which is made of thin steel plate is formed into an annular flange 20 by bending it inwardly, while the other end is formed into the annular side wall section 22 serving as the annular enclosing section also by bending it inwardly and perpendicularly, and an open end of the side wall section is formed into a projecting metal holding section 24 over the whole peripheral edge by further bending the side wall section inwardly and perpendicularly.

The side wall section 22 is provided with two small holes 25 for communicating with the outside air. Though each of the small holes is usually 0.5 to 2 mm in diameter, the diameter can be flexibly decided considering elements of slide bearing unit such as model number, size, heating value, extent of internal pressure increase in the space portion, machinability, etc. Number of the small holes is not limited to two but can be one or not less than three also considering the elements mentioned above.

The spherical oil-impregnated bearing metal 28 of a sintered alloy having a spherical section 26 on the outside is dispoed in the outer cylinder 16. Formed on the metal holding section 24 is a concave spherical section 29 by which the spherical oil-impregnated bearing metal 28 is held coaxially with the outer cylinder 16 and which is in contact with the spherical section 26 to permit self-aligning.

Figure 3:
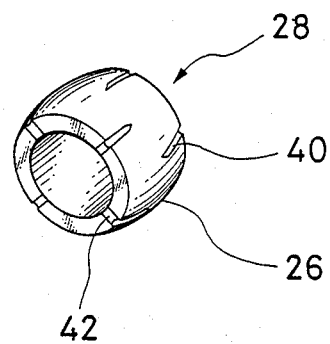
FIG. 3 is a perspective view of the spherical oil-impregnated bearing metal used in the same embodiment.

In addition, as illustrated in FIG. 3, the spherical section 26 of the spherical oil-impregnated bearing metal 28 is provided with a plurality of oil grooves 40 alternately formed from left or right end toward the middle part of the spherical section 26. Oil grooves 42 communicated with the oil grooves 40 are further provided on both sides of the spherical oil-impregnated bearing metal 28.

Disposed on the opposite side of the side wall section 22 in the outer cylinder 16 is a metal holder 32 serving as an enclosing member. This metal holder 32 has a metal pressing section 30 by which the spherical oil-impregnated bearing metal 28 is seated on the metal holding section 24. A cylindrical section 34 engageable with the inner periphery of the outer cylinder 16 is provided on the outside of the metal holder 32, while said annular metal pressing section 30 being provided on the inside thereof. The cylindrical section and the metal pressing section are solidly connected through a stepped side wall section 36. The spherical oil-impregnated bearing metal 28 is pressed against the metal holding section 24 of the outer cylinder 16 through the metal pressing section 30 by the flange section 20 of the outer cylinder 16 in contact with the side wall section 36.

A space formed among outer cylinder 16, metal holder 32 and spherical oil-impregnated bearing section 28 is filled with an oil-storage material 38 composed of fibers impregnated with a lubricating oil.

In addition, the flange section 20, the spherical oil-impregnated bearing metal 28 and the side wall section 36 are located on a common identical plane at their respective sides. Another end of the spherical oil-impregnated bearing metal 28 and the side wall section 22 are also located in the same manner.

The bearing unit 10 of above construction is assembled in the following manner. First, the outer cylinder 16 which is in an incomplete form, i.e., whose part to be the flange section 20 is not yet formed by bending but is a simple cylinder of the same diameter as the cylindrical section 18, is coupled with the spherical oil-impregnated bearing metal 28. After filling the internal part with the oil-storage material 38, the metal holder 32 is inserted therein, and then the portion to be the flange section 20 is bent. In this manner, the metal holder 32 is inseparably disposed and assebly of a slide bearing unit is completed. It is preferable that the portion to be formed into the flange section 20 is thinner than the other portions so as to be easily bent. The slide bearing unit 10 has the same dimensions as a rolling bearing with respect to its internal diameter, external diameter and width.

In the slide bearing unit 10 of the above construction, a lubricating oil impregnated into the oil-storage material 38 is supplied to the surface of a shaft rotatably supported by this slide bearing unit 10 by way of gaps among the structural elements of the sintered alloy in the spherical oil-impregnated bearing material 28 according to the rotational drive of the shaft. The lubricating oil then leaks out at both left and right ends of the spherical oil-impregnated bearing metal 28 according to the rotational drive of the shaft. The leaked lubricating oil going outward by surface tension, etc. then gets into the oil-storage material 38 through metal holding section 24, gap between the metal pressing section 30 and the spherical oil-impregnated bearing metal 28, and the oil grooves 42 provided on both sides of the spherical oil-impregnated bearing metal 28. This circulation is thereafter repeated.

Since the lubrication in the slide bearing unit 10 is performed in the manner mentioned above, the slide bearing unit 10 can have a sufficient amount of lubricating oil to be used by circulation. As a result, there is less loss in the lubricating oil, and the life of the bearing itself can be extended.

Further, when the shaft is continuously driven at high speed, it is possible that lubricating oil impregnated into the oil-storage material 38 and air in the spaces of outer cylinder 16, spherical oil-impregnated bearing metal 28 and metal holder 32 are thermally expanded due to frictional heating by the rotational drive of the shaft. Notwithstanding, the spaces are prevented from increase of internal pressure because the small holes 25 are provided through the side wall section 22 of the outer cylinder 16. As a result, a suitable amount of lubricating oil required for the rotational drive of the shaft is supplied during the operation, and leakage of excess oil can be prevented. When occurring shortage of the oil as a result of use for long period of time, the oil can be supplied through the small holes, which also extends life of the bearing. Furthermore, even when increasing the temperature of the bearing due to the rotational drive of the shaft, the small holes serves as radiator holes restricting the temperature increase (or overheat). When the shaft is generally driven at moderate speed for relatively short time allowing sufficient time for out of operation thereof, temperature increase will be small and provision of the small holes 25 is not always necessary.

The slide bearing unit in accordance with the invention simply comprises an outer cylinder made of a thin steel plate, a spherical oil-impregnated bearing metal and a metal holder as described above, and accordingly number of components is reduced, and moreover the outer cylinder and the metal holder can be formed by press working, which permits easy machining and assembling of the slide bearing unit. As a result, mass production and cost reduction thereby are achieved. Furthermore, because of a simple construction as described above, the slide bearing units of the invention can be in such a manner as to have the same dimensions in internal diameter, external diameter and width as various sizes of roller bearings. As a result, it is now possible to directly replace a prevously used roller bearing with a slide bearing unit of the invention of the same size, otherwise with a slide bearing unit of smaller size.

In the foregoing embodiment, a tapered surface is also preferable, instead of the concave spherical surface 29 formed on the metal holding section 24 of the outer cylinder 16. It is preferable to increase or decrease the number of oil grooves 40, 42 provided on the spherical oil-impregnated bearing metal 28 or to change the length of the grooves. Other known oil-storage materials are also available. It is also preferable to change the dimensions of the slide bearing unit of the foregoing embodiment. The small hole 25 can be provided on the side wall section 36 of the metal holder 32 instead of the side wall section 22 of the outer cylinder 16, otherwise on both side wall sections 22 and 36. The hole 25 is not limited to a circular one but a rectangular slit or other polygonal hole are also preferable. Number of the hole can be freely increased or decreased.

Figure 4:
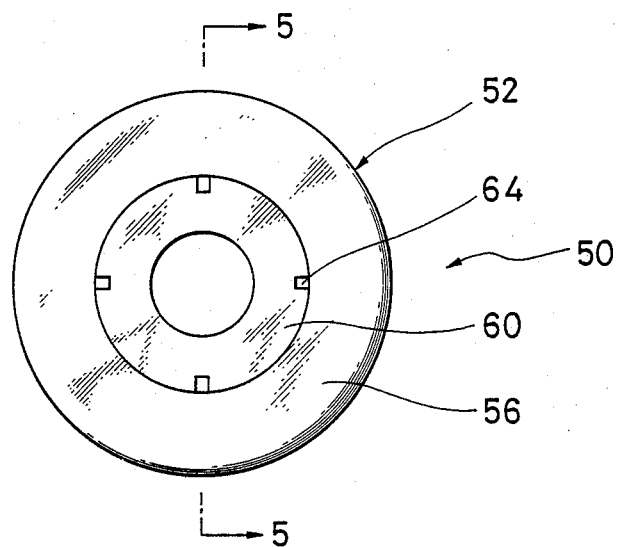
FIG. 4 is an enlarged front view illustrating an example of the invention.
Figure 5:
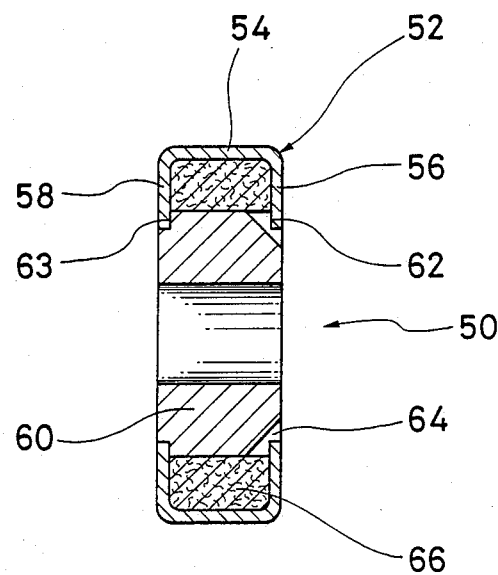
FIG. 5 is a sectional view taken along the line 5—5 in FIG. 4.
Figure 6:
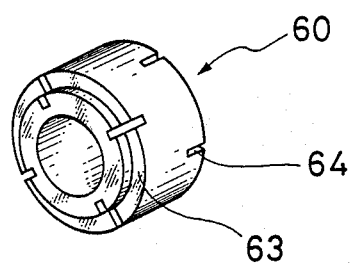
FIG. 6 is a perspective view of the oil-impregnated bearing metal used in the same embodiment.

FIGS. 4 to 6 illustrate another embodiment of the invention.

The flange sections 56, 58 are located on a common identical plane with the two opposite ends of the oil-impregnated bearing metal 60, respectively.

The slide bearing unit 50 of this embodiment is not of self-aligning type. Though the slide bearing unit of this embodiment is actually of small type in the same size as roller bearing of small diameter like the foregoing embodiment, the drawings respectively show enlarged views. In FIGS. 4 and 5, numeral 52 indicates the outer cylinder, and open ends of the cylindrical section 54 which is made of thin steel plate is formed by bending inwardly into an annular flange sections 56, 58 serving as an annular enclosing section. The flange sections 56, 58 engage with the stepped portions 62, 63 of the oil-impregnated bearing metal 60 later described. The oil-impregnated bearing metal 60 is of a sintered alloy having a cylindrical outer peripheral surface on the outside and the stepped portions 62, 63 annularly slendered at the outer periphery of both side ends. The oil-impregnated bearing metal 60 is disposed inside of the outer cylinder 52.

As illustrated in FIG. 6, the stepped portions 62, 63 are alternately provided with a plurality of oil grooves (four oil grooves in this embodiment) from the outer periphery to the side ends, respectively.

A space formed between the outer cylinder 52 and the oil-impregnated bearing metal 60 is filled with an oil-storage material 66 composed of fibers impregnated with a lubricating oil. Filling with the oil-storage material 66 is carried out before forming the flange section 58 by bending. The flange section 58 is bent by press working as illustrated in FIG. 5.

Internal pressure in the space for by being surrounded with the outer cylinder 52 and the oil-impregnated bearing metal 60 is easy to escape because of the small contact area between the flange sections 56, 58 and the stepped portions 62, 63 and low fluid resistance. This results in less increase of internal pressure. Accordingly, small holes 25 as illustrated in FIGS. 1 and 2 are not always necessary in this embodiment.

According to this second embodiment, life of bearing can be extended in the same manner as the foregoing first embodiment. Cost of the slide bearing unit of this embodiment is reduced as compared with that of self-aligning type.

Figure 7:
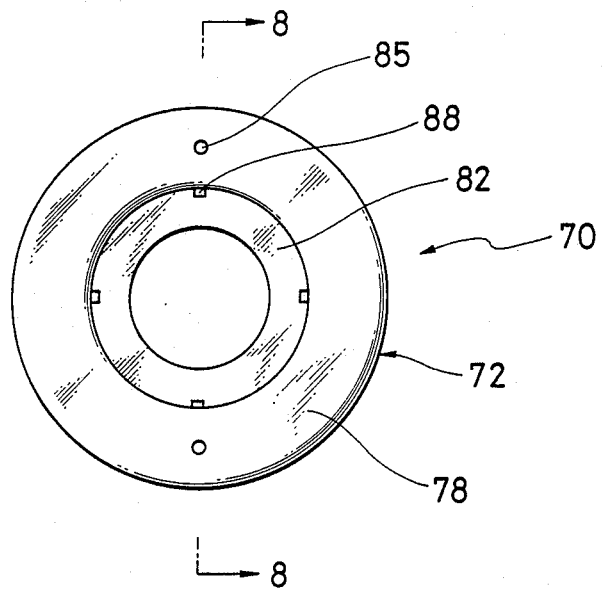
FIG. 7 is an enlarged front view illustrating a further example of the invention.
Figure 8:
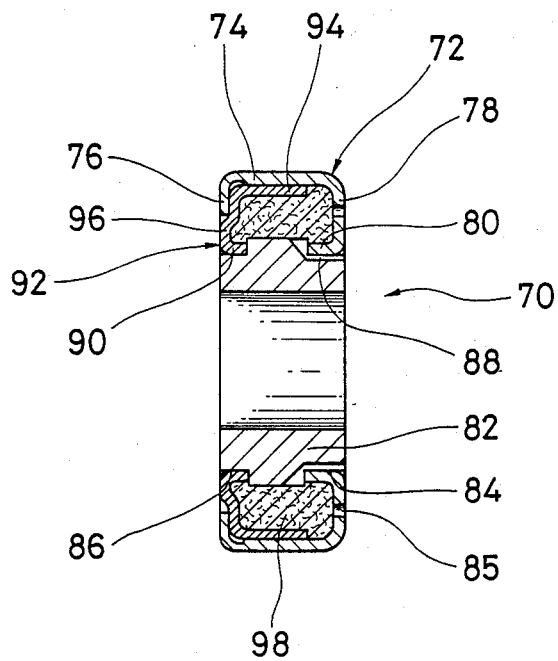
FIG. 8 is a sectional view taken along the line 8—8 in FIG. 7.
Figure 9:
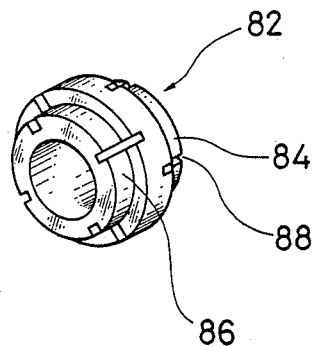
FIG. 9 is a perspective view of the oil-impregnated bearing metal used in the same embodiment.

FIGS. 7 to 9 illustrate further embodiments of the invention. The slide bearing unit 70 in this embodiment illustrated in FIGS. 7 and 8 is not of self-aligning type. Though the slide bearing unit of this embodiment is actually of small type in the same size as roller bearing of small diameter like the foregoing embodiments, the drawings respectively show enlarged views.

Referring to FIGS. 7 and 8, reference numeral 72 denotes the outer cylinder, and one end of the cylindrical section 74 which is made of thin steel plate is formed into an annular flange section 76 by being bent and inwardly and perpendicularly while the other end is formed by bending inwardly into the side wall section 78 serving as the annular enclosing section, and an open end of the side wall section is formed into an annular projecting metal holding section 80 by being bent inwardly and perpendicularly over the whole peripheral edge so as to eangage with the stepped portion 84 of the oil-impregnated bearing metal 82 later described. The side wall section 78 is provided with two small holes 85 for communicating with the outside air. Shape, size and number of the small holes 85 are decided in the same manner as the foregoing first embodiment illustrated in FIGS. 1 and 2. The oil-impregnated bearing metal 82 is of a sintered alloy having a cylindrical outer peripheral surface on the outside and the stepped portions 84, 86 annularly slendered on the outer periphery of both side ends. The oil-impregnated bearing metal 82 is disposed inside of the outer cylinder 72.

As illustrated in FIG. 9, the oil-storage bearing metal 82 is alternately provided with a plurality of oil grooves (four oil grooves on each side in total eight grooves in this embodiment) from the outer periphery to the side ends, respectively.

The metal holder 92 serving as enclosing section and having the metal holding section 90 is disposed on the opposite side of the side wall section 78 in the outer cylinder 72 so as to support the oil-impregnated bearing metal 82 coaxially with the outer cylinder 72 in cooperation with the outer cylinder 72. Outside portion of the metal holder 92 is formed into the cylindrical section 94 which is engageable with the inner periphery of the outer cylinder 72, while inside portion being formed into said annular metal holding section 90. The cylindrical section 94 and the metal pressing section 90 are solidly connected through a stepped side wall section 96. The metal holding section 90 regulates lateral movement of the oil-impregnated bearing metal 82 and holds the oil-impregnated bearing metal 82 coaxially with the outer cylinder 72 in cooperation with the metal holding section 80 of the outer cylinder 72 by the flange section 76 of the outer cylinder 72 in contact with the side wall section 96.

A space formed among outer cylinder 72, metal holder 92 and oil-impregnated bearing metal 82 is filled with an oil-storage material 98 composed of fibers impregnated with a lubricating oil. Filling with the oil-storage material 98 is carried out in the same manner as the foregoing first embodiment illustrated in FIG. 2.

In addition, the flange section 76, the spherical oil-impregnated bearing metal 82 and the side wall section 96 are located on a common identical plane at their respective sides. Another end of the spherical oil-impregnated bearing metal 82 and the side wall section 78 are also located in the same manner.

In the second embodiment illustrated in FIG. 5, because the outer cylinder 52 comprises the flange sections 56, 58 formed by bending inwardly both end portions of the cylindrical section 54 made of a thin steel plate, there is a disadvantage such that strength thereof is deficient when the steel plate is excessively thin, while press working thereof being difficult when steel plate is excessively thick.

On the other hand, in this third embodiment, rigidity of the outer cylinder increases because of the metal holding section 80 provided on the outer cylinder 72. As a result of this, the outer cylinder can be thinned, thereby press working thereof being easy.

Since the oil-impregnated bearing metal 82 holds the flange section 76 not directly but indirectly through the metal holder 92 at one end, assembling of the slide bearing unit as well as machining thereof is now easy. Furthermore, oil leakage can be prevented as a result of providing the small holes 85 in the same manner as the foregoing first embodiment illustrated in FIG. 2.

In the embodiments illustratd in FIGS. 5 and 8, extension of life of bearings, interchangeability with roller bearing and manufacturing of small sized bearing unit are achieved in the same manner as the first embodiment illustrated in FIG. 2. Other known oil-storage materials are also available. It is also possible to change shape and number of the oil grooves 64, 88, or to change size of the slide bearing unit itself.

It should be understood that the foregoing relates to only several preferred embodiments of the present invention, and that it is intended to cover all changes and modifications of the examples of the invention herein choesen for the purpose of the disclosure without departing from the spirit and scope of the invention.

What is claimed is:

1. A slide bearing unit, comprising
a cylindrical outer cylinder made of a thin steel plate;
an oil-impregnated bearing metal having an outer periphery, wherein said outer cylinder is disposed on said outer periphery of said bearing metal;
enclosing sections for holding and enclosing an annular side section between open end portions of the outer cylinder and end portions of the oil-impregnated bearing metal; and
an oil storage material filled within a gap formed between the outer cylinder and the oil-impregnated bearing metal,
wherein one of said enclosing sections comprises one end of the outer cylinder which is inwardly and perpendicularly bent, while the other end of the outer cylinder is engageable with another of said enclosing sections which is also inwardly and perpendicularly bent for abutting with said annular side section and being retained on the other end of the outer cylinder, wherein two opposite sides of said bearing unit are flat, and at least one of the enclosing sections is provided with a small hole for communicating with the outside air.

2. A slide bearing unit, comprising:
a spherical oil-impregnated bearing metal having a convex surface on an outside portion thereof;
an outer cylinder wherein one end of a cylindrical section made of a thin steel plate is formed into a flange section bent inwardly and perpendicularly, the other end is formed into an annular side wall section as a metal holding section bent inwardly and perpendicularly, for holding said spherical oil-impregnated bearing metal to permit self-aligning;
a metal holder separate from said inwardly and perpendicularly bent section of said outer cylinder having an inwardly protruding metal pressing section to seat said spherical oil-impregnated bearing metal on the metal holding section of the outer cylinder and which is disposed in said outer cylinder so as to be prevented from getting out; and
an oil-storage material placed in a gap formed between the outer cylinder and the spherical oil-impregnated bearing metal, two opposite sides of said bearing unit being flat.

3. A slide bearing unit, comprising:
an oil-impregnated bearing metal which is provided with stepped portions being respectively thinned at the outer periphery of side end portions thereof;
an outer cylinder wherein ends of a cylindrical section made of a thin steel plate are formed into flange sections by being bent inwardly and perpendicularly from an outer periphery to an inner portion of said outer cylinder, and said flange sections engage respectively with said stepped portions of the oil-impregnated bearing metal; and
an oil-storage material placed in a gap formed between the outer cylinder and the oil-impregnated bearing metal, two opposite sides of said bearing unit being flat.

4. A slide bearing unit, comprising:
an oil-impregnated bearing metal which is provided with stepped portions being thinned at the outer periphery of side end portions thereof;
an outer cylinder wherein one end of a cylindrical section made of a thin steel plate is formed into a flange section by being bent inwardly and perpendicularly from an outer periphery to an inner portion of the outer cylinder, the other end is formed into an annular side wall section by being bent inwardly and perpendicularly, and further having an open end of the side wall section formed into an annular metal holding section by being bent inwardly so as to engage with one of said stepped portions;

a metal holder having an annular projecting metal holding section formed in such a manner as to engage with the other stepped portion of said oil-impregnated bearing metal, and disposed in said outer cylinder so as to be prevented from getting out to thereby hold the oil-impregnated bearing metal in cooperation with said metal holding section of the outer cylinder; and an oil-impregnated material placed in a gap formed between the outer cylinder and the oil-impregnated bearing metal, two opposite sides of said bearing unit being flat.

5. A slide bearing unit as in claims 2 or 4, wherein at least one small hole for communicating with the outside air is formed through at least one of said side wall section of the outer cylinder and said side wall section of the metal holder.

* * * * *